United States Patent
Levy et al.

(10) Patent No.: US 10,248,839 B2
(45) Date of Patent: Apr. 2, 2019

(54) LOCATING OBJECTS WITHIN DEPTH IMAGES

(71) Applicant: Intel Corporation, Santa Clara, CA (US)

(72) Inventors: Ofir Levy, Jerusalem (IL); Maoz Madmony, Beit Kama (IL); Orly Weisel, Elazar (IL)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 14/953,622

(22) Filed: Nov. 30, 2015

(65) Prior Publication Data
US 2017/0154432 A1 Jun. 1, 2017

(51) Int. Cl.
G06K 9/00 (2006.01)
G06T 7/11 (2017.01)
G06T 7/187 (2017.01)

(52) U.S. Cl.
CPC ..... *G06K 9/00228* (2013.01); *G06K 9/00369* (2013.01); *G06K 9/00375* (2013.01); *G06K 9/00604* (2013.01); *G06T 7/11* (2017.01); *G06T 7/187* (2017.01); *G06K 2209/21* (2013.01); *G06T 2200/04* (2013.01); *G06T 2207/10012* (2013.01); *G06T 2207/10028* (2013.01); *G06T 2207/30196* (2013.01); *G06T 2207/30241* (2013.01)

(58) Field of Classification Search
CPC .............................. G06K 2209/21; G06T 7/215
See application file for complete search history.

(56) References Cited

U.S. PATENT DOCUMENTS

| | | | | |
|---|---|---|---|---|
| 6,483,940 B1* | 11/2002 | Wang | ........................ | G06K 9/38 358/515 |
| 6,661,918 B1* | 12/2003 | Gordon | .................... | G06K 9/38 382/164 |
| 8,594,425 B2* | 11/2013 | Gurman | ............. | G06K 9/00201 382/173 |
| 9,152,243 B2* | 10/2015 | Gu | ...................... | G06K 9/00208 |
| 9,208,571 B2* | 12/2015 | Evertt | .................. | H04N 5/2226 |
| 9,622,322 B2* | 4/2017 | Liao | ................... | H05B 37/0227 |

(Continued)

FOREIGN PATENT DOCUMENTS

WO WO 2015059700 A1 * 4/2015 ............. A61B 5/087
WO 2015108737 A1 7/2015

OTHER PUBLICATIONS

International Search Report and the Written Opinion of the International Searching Authority in corresponding PCT application No. PCT/US2016/053666 dated Jan. 10, 2017.

(Continued)

*Primary Examiner* — Avinash Yentrapati
(74) *Attorney, Agent, or Firm* — Trop Pruner & Hu, P.C.

(57) ABSTRACT

In accordance with some embodiments, connected-component labeling is performed in both the screen dimensions (which may be referred to as the x and y dimensions) and a depth dimension to label objects in a depth image. Then the contour of labeled blobs may be used to identify an object in the depth image. Using contours may be advantageous in some embodiments because it reduces the amount of data that must be handled and the extent of computations, compared to conventional techniques which use bit map based operations.

25 Claims, 7 Drawing Sheets

(56) References Cited

U.S. PATENT DOCUMENTS

| | | | |
|---|---|---|---|
| 9,747,498 B2* | 8/2017 | Wabgaonkar | G06K 9/78 |
| 9,858,677 B2* | 1/2018 | Romanenko | G06T 7/20 |
| 2002/0081013 A1* | 6/2002 | Raz | G06K 9/0014 382/133 |
| 2006/0239558 A1* | 10/2006 | Rafii | G06K 9/00201 382/181 |
| 2008/0075353 A1* | 3/2008 | Tek | G01N 21/4738 382/145 |
| 2008/0118106 A1* | 5/2008 | Kilambi | G06K 9/00362 382/103 |
| 2008/0152191 A1* | 6/2008 | Fujimura | G06K 9/00214 382/103 |
| 2008/0273772 A1* | 11/2008 | Hu | G06T 7/11 382/128 |
| 2008/0314234 A1* | 12/2008 | Boyd | F41H 11/02 89/1.11 |
| 2009/0129654 A1* | 5/2009 | Huo | G06T 7/74 382/132 |
| 2009/0226033 A1* | 9/2009 | Sefcik | G06K 9/3233 382/103 |
| 2009/0290778 A1* | 11/2009 | Sun | G06K 9/3233 382/131 |
| 2010/0034457 A1* | 2/2010 | Berliner | G06K 9/00362 382/154 |
| 2010/0111370 A1* | 5/2010 | Black | G06K 9/00369 382/111 |
| 2010/0208063 A1* | 8/2010 | Lee | G06K 9/00771 348/143 |
| 2011/0007940 A1* | 1/2011 | Hamza | G06K 9/0063 382/103 |
| 2011/0211729 A1* | 9/2011 | Ramalingam | G06K 9/00201 382/103 |
| 2011/0228987 A1* | 9/2011 | Iwasaki | G06T 7/215 382/107 |
| 2011/0293137 A1* | 12/2011 | Gurman | G06K 9/00201 382/103 |
| 2012/0051631 A1* | 3/2012 | Nguyen | G06K 9/38 382/164 |
| 2012/0076361 A1* | 3/2012 | Fujiyoshi | G01S 17/89 382/103 |
| 2012/0121168 A1* | 5/2012 | Pavlovich | G06K 9/00771 382/154 |
| 2012/0321190 A1* | 12/2012 | Sullender | G06K 9/342 382/180 |
| 2012/0327125 A1* | 12/2012 | Kutliroff | G06F 3/017 345/660 |
| 2013/0230237 A1* | 9/2013 | Schlosser | G06T 7/11 382/164 |
| 2013/0266174 A1* | 10/2013 | Bleiweiss | G06K 9/00355 382/103 |
| 2014/0056471 A1* | 2/2014 | Gu | G06K 9/00208 382/103 |
| 2014/0072212 A1* | 3/2014 | Sorgi | G06T 7/11 382/164 |
| 2014/0123077 A1* | 5/2014 | Kutliroff | G06F 3/017 715/863 |
| 2014/0232631 A1* | 8/2014 | Fleischmann | G06F 3/017 345/156 |
| 2014/0294288 A1* | 10/2014 | Nguyen | G06K 9/38 382/154 |
| 2014/0321718 A1* | 10/2014 | Wabgaonkar | G06K 9/78 382/115 |
| 2014/0354630 A1* | 12/2014 | Kim | G06T 13/60 345/419 |
| 2015/0058782 A1* | 2/2015 | Kutliroff | G06F 3/04815 715/773 |
| 2015/0078640 A1* | 3/2015 | Guo | G06T 7/149 382/131 |
| 2015/0117789 A1* | 4/2015 | Miyashita | G06K 9/4604 382/201 |
| 2015/0181679 A1* | 6/2015 | Liao | H05B 37/0227 315/291 |
| 2015/0199592 A1* | 7/2015 | Kim | G06K 9/6267 382/202 |
| 2015/0242683 A1* | 8/2015 | Tang | G06K 9/00389 382/173 |
| 2015/0286868 A1* | 10/2015 | Flores | G06K 9/00651 382/103 |
| 2016/0035124 A1* | 2/2016 | Sinha | G06T 7/187 345/424 |
| 2016/0070989 A1* | 3/2016 | Jang | G06K 9/00295 382/103 |
| 2016/0105667 A1* | 4/2016 | Yang | H04N 13/366 348/55 |
| 2016/0235344 A1* | 8/2016 | Auerbach | A61B 5/087 |
| 2016/0259041 A1* | 9/2016 | Tan | G01S 13/003 |
| 2016/0350938 A1* | 12/2016 | Maltese | G06K 9/00 |
| 2016/0379055 A1* | 12/2016 | Loui | G06K 9/00718 382/103 |
| 2017/0208417 A1* | 7/2017 | Thakur | H04S 7/303 |

OTHER PUBLICATIONS

PCT Search Report and Written Opinion in corresponding PCT application No. PCT/US2016/053666 filed Sep. 26, 2016 (12 pages).

* cited by examiner

LOCATING OBJECTS WITHIN DEPTH IMAGES

BACKGROUND

This relates to depth images. Depth images are captured by depth cameras. The depth image includes a two-dimensional (2D) depiction of the object together with depth data that indicates the distances of points on the object from the camera.

A depth camera may be used to identify and track an object. For example, it may be desirable to track hand movement in order to detect gestures made as inputs for computer control. In addition, it may be desirable to identify a user's face in order to identify the individual and/or to locate the user's eyes for purposes of gaze detection.

Connected-component labeling is a technique that may be used with image analysis to identify and track objects in two-dimensional depictions. Generally, connected-component labeling generates labels that identify distinct areas within an image. One of these areas may then be associated with an object to be detected in order to identify that object and, in some cases, to track the object.

However one problem in trying to apply connected-component labeling to more complex depictions, such as those involving three-dimensions including depth images, is that the extent of calculations in three-dimensions becomes a drag on the performance of the system. This results in increased processing time, slow operation and excessive battery consumption in some cases.

BRIEF DESCRIPTION OF THE DRAWINGS

Some embodiments are described with respect to the following figures.

DETAILED DESCRIPTION

A general technique for tracking any object depicted in a depth image is described in connection with one example, hand tracking. However tracking of other objects, using the same techniques, including arms, faces, full bodies, to mention a few examples, is also feasible.

Depth images include three-dimensional data with conventional frame rates such as sixty (60) frames per second. Therefore, it is desirable to make any algorithm efficient and fast. In some cases where the background is close to the hand, or the hand is occluded by the user's head or other hand, object detection may be more complex.

In accordance with some embodiments, connected-component labeling is performed in both the screen dimensions (which may be referred to as the x and y dimensions) and a depth dimension to label objects in a depth image. Then the contour of labeled blobs may be used to identify an object in the depth image. Using contours may be advantageous in some embodiments because it reduces the amount of data that must be handled and the extent of computations, compared to conventional techniques that use bit map based operations.

Initially a raw depth image may include numbers that define the distance of the object in a certain pixel from the camera (e.g. if the object is 2 meters from the camera, the value of this pixel will be 2.f (f=float)).

To partition the image, a relatively discrete number of flat areas of substantially the same distance from the camera may be identified. The number of flat areas or seeds that are identified may be determined by setting a threshold. The threshold itself may be a function of other things, described later herein, but may also be a function of the number of seeds that are desired in order to increase accuracy or reduce computational complexity.

Initially, derivatives are taken of the seeds to find flat areas within the depth image. Calculating the derivative images may be done by: (1) running minimum filter on the depth image so each pixel gets the minimum value in its 5×5 area; and (2) subtracting the calculated minimum depth image from the original depth image. This creates the derivative image called image of diff. A new auxiliary image that is a binary image where all pixels with a derivative greater than a threshold are set at equal to zero and all other pixels are set to 255.

Next connected-component labeling is used on these seeds to produce a sufficient number of labeled seeds. Once a threshold is chosen, (and it is a fixed number done in compilation time), the number of seeds is not controllable. To some cases, it can be few and in some busy scenes it can be hundreds of seeds. Ideally, one (and only one) of these labeled seeds defines an object to be detected such as a hand.

However, in some cases, a seed may include more than a single hand to be detected including, for example, another hand or additional body portions or background. These situations create what may be called "occlusions" may be handled as also described herein.

The seed defines a more central region of a labeled blob or depicted object of substantially the same color (i.e. distance from the camera). Then, the seed is expanded or dilated to include all the pixels that define the object. In any depiction, there will be pixels that, initially, are not associated with any labeled blob. This are the pixels that have a gradient set greater than a threshold. These are the candidates for expansion of a labeled seed that annexes these candidates. The challenge then becomes determining which labeled seed should annex these unlabeled pixels.

In one embodiment it is determined which unlabeled pixel, a given labeled seed will annex based on the geodesic distance of the unlabeled pixel from the labeled seed. The "geodesic distance" is the distance between the unlabeled pixel and the labeled seed in the x and y or screen dimensions and the depth dimension. To give an example of geodesic distance, a pixel could move down by two and then up by three units. As a result the pixel may end up only one unit from the origin but its geodesic distance from the origin is five.

Then the seeds are expanded to include their closest unlabeled pixels in a process that may be called dilation, expansion or propagation in some cases. Once labeled and dilated, seeds account for all or the majority of the pixels in the depth image. There is a "competition" between the seeds for the unlabeled pixels. Each pixel can be attached to only one seed.

The next operation is to try to identify a particular object in the image based on its expanded, labeled seed. Ideally, the object to be identified, such as a hand, is the subject of one and only one labeled blob. In other words, ideally the labeled blob contains the object to be identified and substantially nothing else.

Initially, the contours or borders of each labeled blob are identified in order to reduce processing costs by using only the contours of the labeled blob and not all the pixels within the blob. Then a distance map is calculated from a previous depiction of that object (e.g. in a prior frame). By using a distance map, instead of trying to start from first principles to identify the object in each frame, processing costs may be substantially reduced. This distance map may be calculated in the x and y screen dimensions, and the depth dimension, in some embodiments. Knowing the expected rate of movement of the object, labeled blobs within a given distance in successive frames, may be labeled as the same blob as in a prior frame.

Then an attempt is made to match the labeled blob in a present frame with a identified object in a previous frame. This may be done by counting the number of pixels on the contour at a distance to a previous hand of less than a predetermined threshold in one embodiment. This predetermined threshold may be based for example on the now identified object's expected rate of movement.

Then a grade may be generated based on the number of matched pixels divided by the size of the contour. If the grade is greater than another threshold, then the candidate labeled blob is declared a match for the object to be identified. Otherwise, it is declared a non-match. This threshold is a function of: (1) distance of the object from the camera; (2) maximum expected speed of the object; (3) camera frame rate (fps). The distance map is calculated in the spatial domain, (in pixel units) and the maximum expected speed is in meters per second. First, the maximum distance the hand can pass in one frame is determined and then this meter unit to pixel unit is converted as function of the distance of the object from the camera.

In some cases issues arise, called occlusions, which create problems in performing object identification. The first step in correcting such occlusions is to identify them. In some embodiments occlusions may be detected when a label fits more than one object, such as a hand to be detected. Also an occlusion may be detected when a label attached to a previous object to be detected is also attached to background in the depth image.

Once an occlusion is detected, it may be corrected using a number of techniques. For example in one embodiment, the occlusion may be disambiguated by splitting objects by relabeling, as a distinct object, all the moving pixels. For example in connection with hand detection, the hand may be getting occluded with background. Non-moving pixels are assumed to be getting the same label as before: hand pixels stay as hand, and background pixels stays background. These non-moving pixels are the seeds, and now the "competition" between the hand and the background seeds on all the moving pixels is implemented. Actually the same code is run as when the labels are created at the beginning, but now the seeds are created in a different way.

Thus, the hand may be distinguished from background based on the speed of the pixels defining the hand's contour. The process is as follows: (1) find the moving pixels (pixels whose depth value changed by more than x cm (e.g. 1 cm) and label as moving; (2) consider all static pixels as what they were in the previous frame (If it was hand, it stays hand, it was background, it stays background); (3) relabel the moving pixels by using the geodesic map.

In another embodiment, an object may be distinguished from another object by eroding the pixels of the occluded object and then expanding or dilating those pixels. This may apply in the case where one is trying to detect a hand but two hands are at the same depth and are touching. Thus the system miscomprehends the two hands as a single object which is not useful in many cases. By eroding the labeled blob to define center regions of each of the hands, one can then define the two separate objects and then rebuild or dilate those center regions to create two separately labeled objects.

Another issue that can arise in connection with object identification is that the threshold that is used to segment one object in the depiction from another may be such that the object to be identified gets combined with something else which is not of interest. The combining may occur because two objects are at substantially the same distance from the camera. As an example, in some arrangements, the hand, the arm, and a portion of the torso may all be considered one labeled blob because they are substantially the same distance from the camera and the threshold used for separating blobs into seeds may be such that all three items end up being combined into one labeled blob.

This situation may be identified when nothing matching the object to be identified is seen yet it is known, for example based on previous frame analysis, that the object must still be there in the current frame.

In such cases, a convex hull may be created that surrounds the labeled blob. Then the biggest defect in the convex hull is identified. A convex hull or convex envelope of a set of points is the smallest convex set that contains the set of points. A set of points is convex of it contains line segments connecting each pair of points.

Next the closest point opposite to the biggest defect may be identified. A line between that closest opposite point and the defect defines a cut line which may be used to separate the object to be identified from the rest of the blob and to create two labeled blobs.

The same techniques may be implemented, for example using affine hulls or a simplified contour technique which describes the contour with a small number of points instead of a convex hull.

A series of sequences shown in FIGS. 1-5 may be individual separate entities or may be part of a single module that performs the functions corresponding to all five figures. The sequences may be implemented in software, firmware and/or hardware. In software and firmware embodiments they may be executed by computer executed instructions stored in one or more non-transitory computer readable media such as magnetic, optical or semiconductor storage. In one embodiment it may be implemented by a hardware processor within a depth camera.

Figure 1:
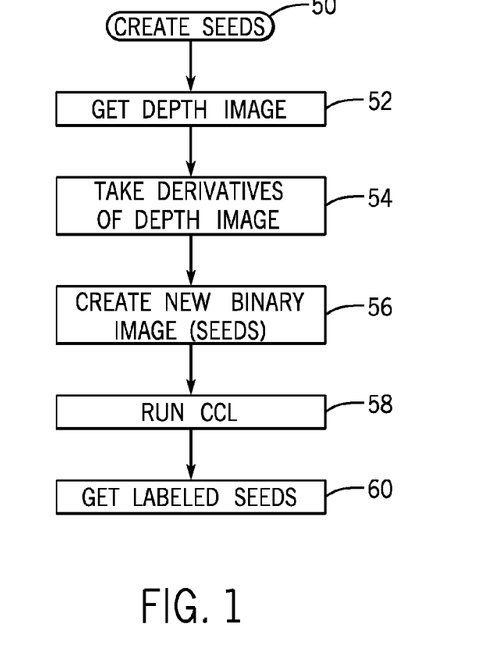
FIG. 1 is a flow chart showing how seeds are created in accordance with one embodiment.

The sequence shown in FIG. 1 may create seeds by finding flat areas within a depth image. The sequence 50 begins by getting the depth image as shown in block 52. Then the derivatives of the depth image are taken as indicated in block 54. A new binary image (seeds), with the same size as the depth image is created such that:

seeds($u,v$)={0|derivative($u,v$)>Threshold;

255|($u,v$<Threshold}.

In general, for each connected component (label) in the seed image, you can find a path, between any two pixels in this label that the maximum derivative in this path is smaller than a threshold. Then connected component labeling is run as indicated in block 58 to get labeled seeds as indicated in block 60.

Figure 2:
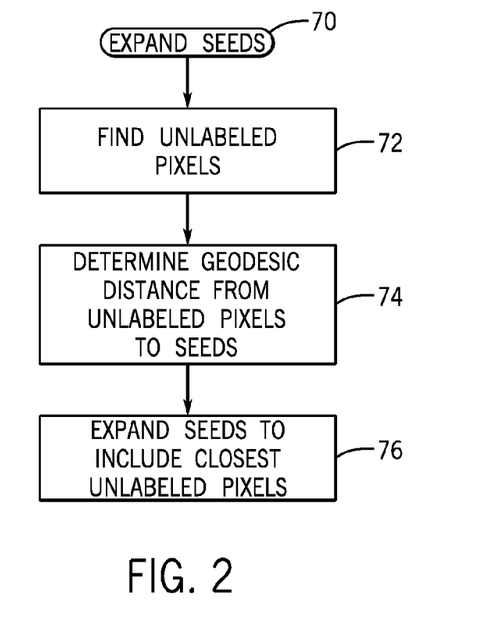
FIG. 2 is a flow chart showing how seeds are expanded according to one embodiment.

The sequence shown in FIG. 2 expands the seeds to annex proximate unlabeled pixels. The sequence 70 begins by finding unlabeled pixels as indicated in block 72. Then the geodesic distance from unlabeled pixels to the seed is determined as indicated in block 74. Finally the seeds are expanded to include the closest unlabeled pixels. Each label competes with the other label for the unlabeled pixels. A label will win the pixel, if it is the closest to this pixel (geodesic wise).

Figure 3:
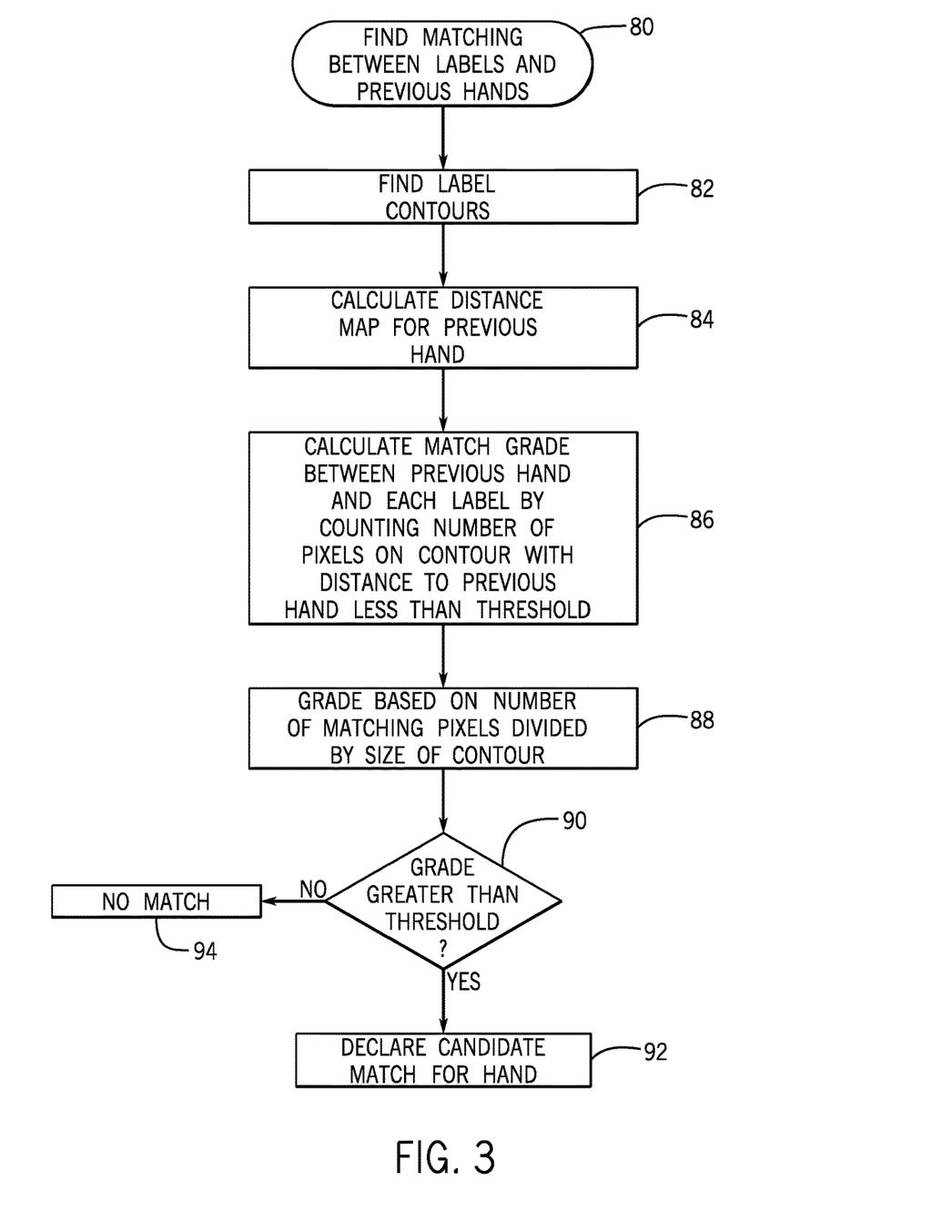
FIG. 3 is a flow chart showing how matching between labels and previous objects to be detected, such as hands, may be handled in accordance with one embodiment.

The sequence 80 shown in FIG. 3 finds matching between labels in previous hands. The sequence begins by finding labeled contours as indicated in block 82. Then the distance map for previous objects is calculated as indicated in block 84.

Next a match grade is calculated between the previous hand and each label by counting number of pixels on a contour with a distance to the previous hand less than a threshold as indicated in block 86. Then a grade is determined based on the number of matching pixels divided by the size of the contours indicated in block 88.

If the grade is greater than a threshold, as determined in diamond 90, the candidate is declared a match for the hand as indicated in block 92. Otherwise, no match is declared as indicated in block 94.

Figure 4:
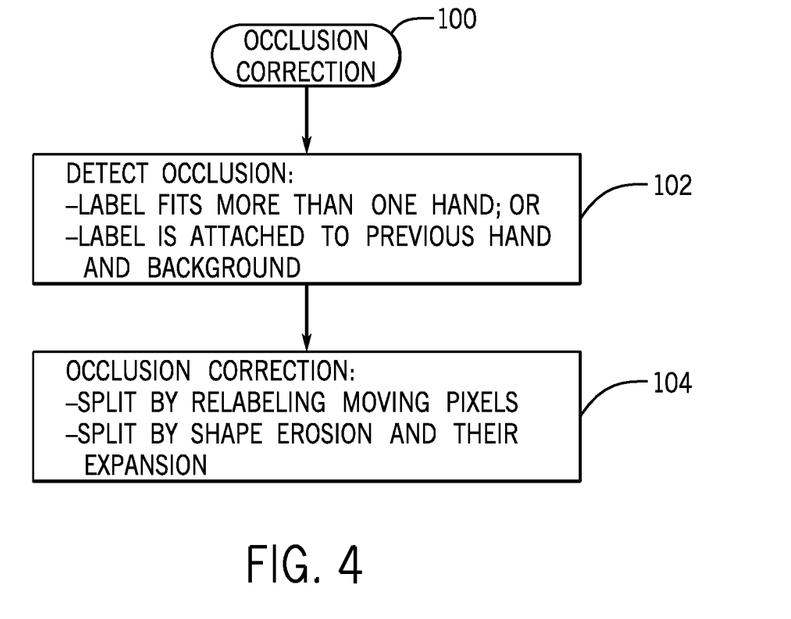
FIG. 4 is a flow chart showing how corrections can be undertaken for occlusions in accordance with some embodiments.

The sequence 100 shown in FIG. 4 shows a general technique for occlusion detection and correction. Occlusion is detected in block 102 by determining whether a label fits more than one hand or label is attached to a previous hand as well as background. Other examples of occlusion detection may also be used.

Next occlusion correction is indicated in block 104. Two techniques for occlusion correction include splitting by relabeling moving pixels. In addition in another embodiment, splitting may be done by shape erosion and then expansion.

Figure 5:
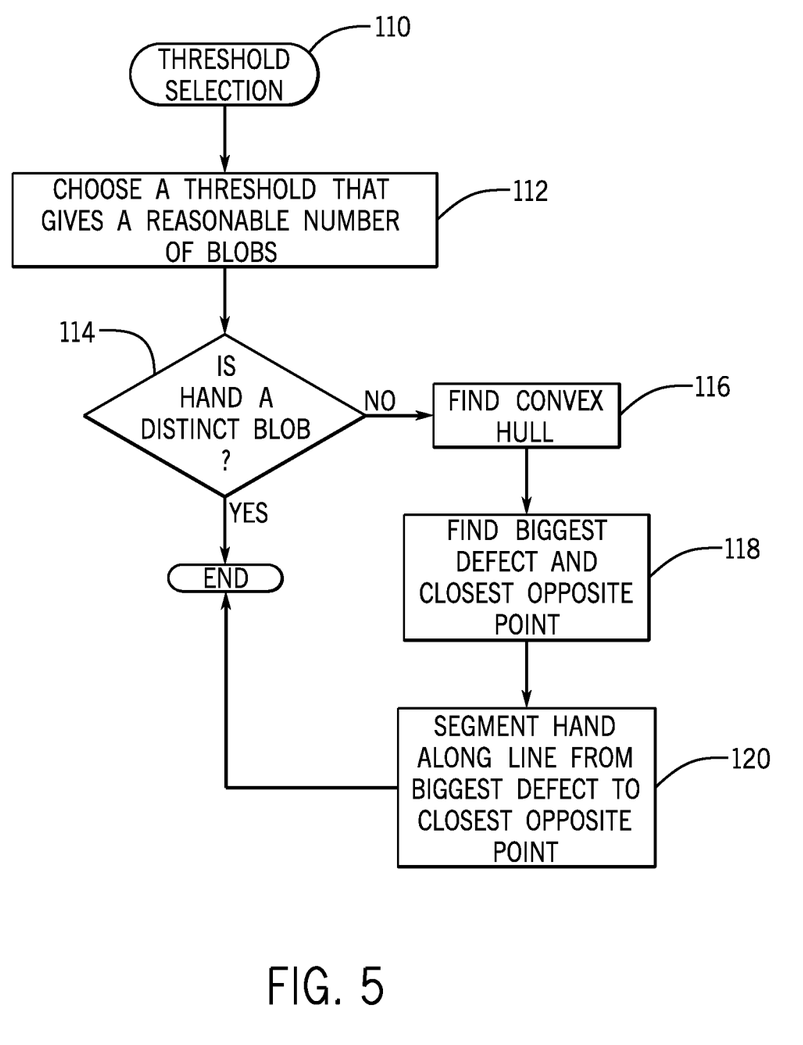
FIG. 5 shows a flow chart for developing a threshold to define the granularity used for identifying blobs as should be labeled in accordance with some embodiments.

The sequence 110 shown in FIG. 5 may be used for threshold selection (block 112). This choosing the threshold is done offline. This threshold is fixed and the best threshold is found empirically. This threshold can be changed due to the kind of object being tracked or the camera noise level. Then a check at diamond 114 determines is the hand a distinct blob. Labels that are too big to be a hand are divided into smaller labels. If the hand is a distinct blob, the flow ends.

Otherwise, a convex hull may be found as indicated in block 116. Then the biggest defect and closest opposite point are found in block 118. Finally, the hand is segmented along a line from the biggest defect to the closest opposite point as indicated in block 120.

Figure 6:
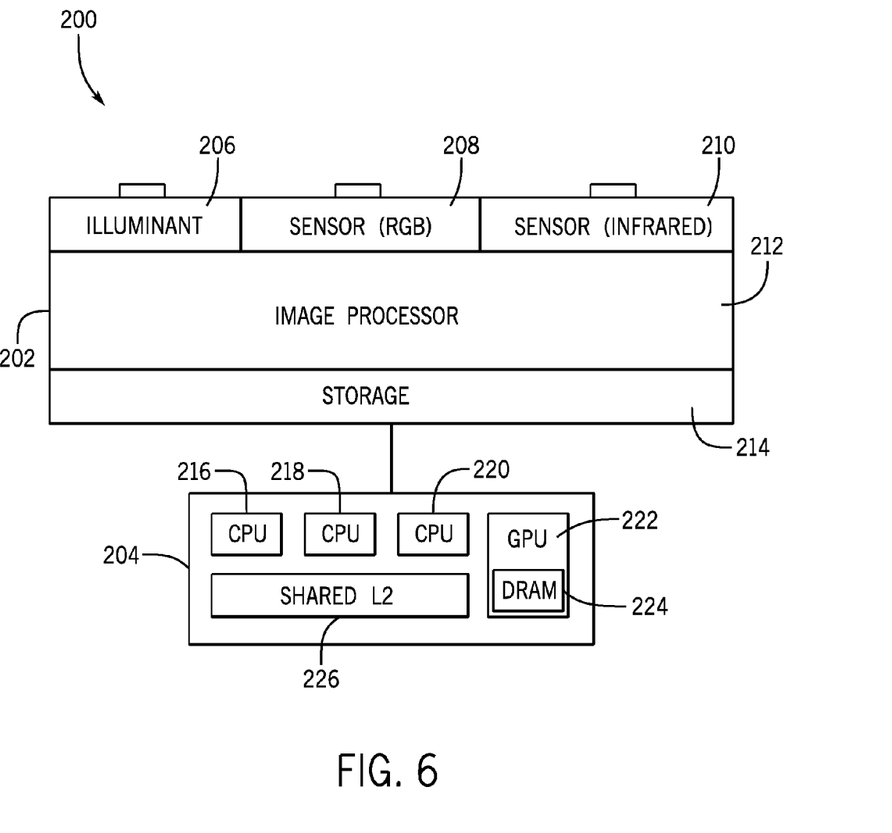
FIG. 6 is a hardware depiction for one embodiment.

Referring to FIG. 6, a depth sensing system 200 may include a depth sensing camera 202 coupled to a platform, host or computer 204. The depth sensing camera 202 includes an illuminant 206 which may be a traditional projector or a laser plus a diffuser that makes a random dot pattern, to mention two examples. A first sensor 208 senses color (e.g. RGB) in visible light and a second sensor 210 senses infrared. The illuminant produces both visible light and infrared light which is then sensed by the sensors 208 and 210.

The illuminant and sensors are connected to an image processor 212 which includes storage 214.

The depth sensing camera 202 may be coupled to a platform 204 that includes central processing units (CPUs) 216, 218 and 220 as well as a graphics processing unit 222 with its own storage 224, such as dynamic random access memory (DRAM). The CPUs may have a shared level 2 (L2) cache 226. In some embodiments, all or part of the sequences shown in FIGS. 1-5 may be implemented by the image processor 212 and its storage 214. However in other embodiments, some tasks may be offloaded to the platform 204.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

Figure 7:
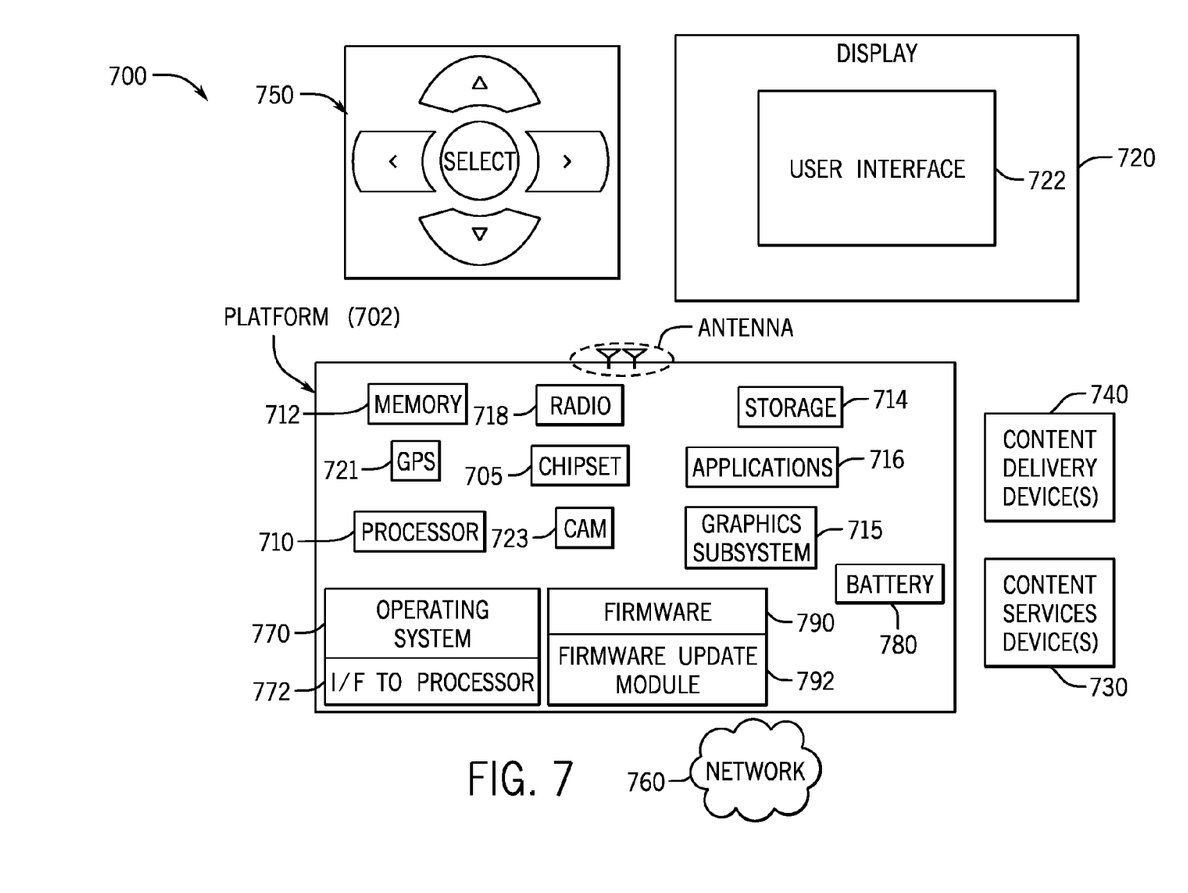
FIG. 7 is a system depiction for one embodiment.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 1-5 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
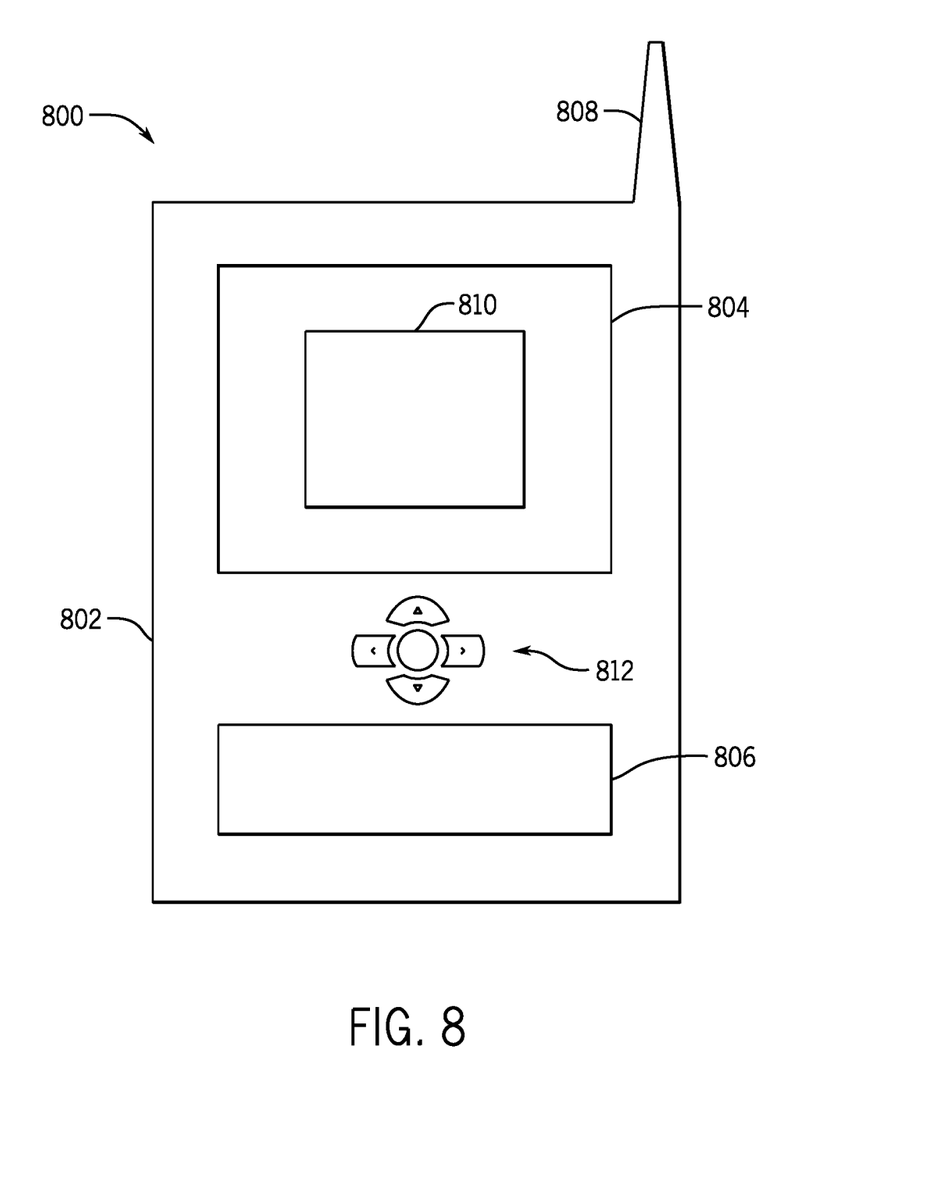
FIG. 8 is front elevation of a system according to one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 8, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

A method comprising performing connected components labelling in both screen dimensions and a depth dimension to label objects in a depth image, and using a contour of said labels to identify an object in the depth image. The method may include performing connected components labelling by allowing two labels to be neighbors that touch one another. The method may include identifying an occlusion. The method may include using shape erosion followed by propagation to disambiguate said labels. The method may include correcting for occlusion by splitting and relabeling only moving pixels. The method may include developing an object movement threshold to determine whether a depicted object is an object to be identified. The method may include determining the threshold based on an expected maximum speed of an object to be identified. The method may include basing the threshold on the maximum number of desired labels. The method may include identifying an object within a labeled blob by finding a convex hull that surrounds the blob. The method may include finding a defect in said blob and a closest opposite point and using said defect and point to segment an object to be identified from a remainder of the blob.

In another example embodiment may be one or more non-transitory computer readable media storing instructions to perform a sequence comprising performing connected components labelling in both screen dimensions and a depth dimension to label objects in a depth image, and using a contour of said labels to identify an object in the depth image. The media may further store instructions to perform a sequence including performing connected components labelling by allowing two labels to be neighbors that touch one another. The media may further store instructions to perform a sequence including identifying an occlusion. The media may further store instructions to perform a sequence including using shape erosion followed by propagation to disambiguate said labels. The media may further store instructions to perform a sequence including correcting for occlusion by splitting and relabeling only moving pixels. The media may further store instructions to perform a sequence including developing an object movement threshold to determine whether a depicted object is an object to be identified. The media may further store instructions to perform a sequence including determining the threshold based on an expected maximum speed of an object to be identified. The media may further store instructions to perform a sequence including basing the threshold on the maximum number of desired labels. The media may further store instructions to perform a sequence including identifying an object within a labeled blob by finding a convex hull that surrounds the blob. The media may further store instructions to perform a sequence including finding a defect in said blob and a closest opposite point and using said defect and point to segment an object to be identified from a remainder of the blob.

Another example embodiment may be an apparatus comprising a processor to perform connected components labelling in both screen dimensions and a depth dimension to label objects in a depth image and use a contour of said labels to identify an object in the depth image, and a memory coupled to said processor. The apparatus of said processor to perform connected components labelling by allowing two labels to be neighbors that touch one another. The apparatus of said processor to identify an occlusion. The apparatus of said processor to use shape erosion followed by propagation to disambiguate said labels. The apparatus of said processor to correct for occlusion by splitting and relabeling only moving pixels. The apparatus of said processor to develop an object movement threshold to determine whether a depicted object is an object to be identified. The apparatus of said processor to determine the threshold based on an expected maximum speed of an object to be identified. The apparatus of said processor to base the threshold on the maximum number of desired labels. The apparatus of said processor to include a battery. The apparatus of said processor to include firmware and a module to update said firmware.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

What is claimed is:

1. A method comprising:
   performing on a computer connected components labelling in both screen dimensions and a depth dimension to label objects in a depth image;
   using a contour of said labels to identify an object in the depth image using said computer;
   identifying an object within a labeled blob by finding a convex hull that surrounds a blob labelled by said connected components labelling; and
   finding a defect in said blob and a closest opposite point on the convex hull and using a line from said defect to said closest opposite point to segment the object to be identified from a remainder of the blob.

2. The method of claim 1 including performing connected components labelling by allowing two labels to be neighbors that touch one another.

3. The method of claim 1 including identifying an occlusion.

4. The method of claim 3 including determining which of at least two objects, a group of pixels is connected to, using shape erosion followed by propagation.

5. The method of claim 3 including correcting for occlusion by relabeling only moving pixels.

6. The method of claim 1 including developing an object movement threshold to determine whether a depicted object is an object to be identified.

7. The method of claim 6 including determining the threshold based on an expected maximum speed of an object to be identified.

8. The method of claim 7 including basing the threshold on the maximum number of desired labels.

9. One or more non-transitory computer readable media storing instructions to perform a sequence comprising:
   performing using a computer connected components labelling in both screen dimensions and a depth dimension to label objects in a depth image using said computer;
   using a contour of said labels to identify an object in the depth image;
   identifying an object within a labeled blob by finding a convex hull that surrounds a blob labelled by said connected components labelling; and
   finding a defect in said blob and a closest opposite point on the convex hull and using a line from said defect to said closest opposite point to segment the object to be identified from a remainder of the blob.

10. The media of claim 9, further storing instructions to perform a sequence including performing connected components labelling by allowing two labels to be neighbors that touch one another.

11. The media of claim 9, further storing instructions to perform a sequence including identifying an occlusion.

12. The media of claim 11, further storing instructions to perform a sequence including determining which of at least two objects, a group of pixels is connected to, using shape erosion followed by propagation.

13. The media of claim 11, further storing instructions to perform a sequence including correcting for occlusion by relabeling only moving pixels.

14. The media of claim 9, further storing instructions to perform a sequence including developing an object movement threshold to determine whether a depicted object is an object to be identified.

15. The media of claim 14, further storing instructions to perform a sequence including determining the threshold based on an expected maximum speed of an object to be identified.

16. The media of claim 15, further storing instructions to perform a sequence including basing the threshold on the maximum number of desired labels.

17. An apparatus comprising:
   a processor to perform connected components labelling in both screen dimensions and a depth dimension to label objects in a depth image and use a contour of said labels to identify an object in the depth image, identify an object within a labeled blob by finding a convex hull that surrounds a blob labelled by said connected components labelling, find a defect in said blob and a closest opposite point on the convex hull and using a line from said defect to said closest opposite point to segment the object to be identified from a remainder of the blob; and
   a memory coupled to said processor.

18. The apparatus of claim 17, said processor to perform connected components labelling by allowing two labels to be neighbors that touch one another.

19. The apparatus of claim 17, said processor to identify an occlusion.

20. The apparatus of claim 19, said processor to determine which of at least two objects, a group of pixels is connected to, by using shape erosion followed by propagation.

21. The apparatus of claim 19, said processor to correct for occlusion by relabeling only moving pixels.

22. The apparatus of claim 17, said processor to develop an object movement threshold to determine whether a depicted object is an object to be identified.

23. The apparatus of claim 22, said processor to determine the threshold based on an expected maximum speed of an object to be identified.

24. The apparatus of claim 23, said processor to base the threshold on the maximum number of desired labels.

25. The apparatus of claim 17 including a battery.

* * * * *